United States Patent
Gupta et al.

(10) Patent No.: US 10,783,109 B2
(45) Date of Patent: Sep. 22, 2020

(54) DEVICE MANAGEMENT MESSAGING PROTOCOL PROXY

(71) Applicant: Dell Products, L.P., Round Rock, TX (US)

(72) Inventors: Chitrak Gupta, Bangalore (IN); Rama Rao Bisa, Bangalore (IN); Rajeshkumar Ichchhubhai Patel, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 142 days.

(21) Appl. No.: 16/169,727

(22) Filed: Oct. 24, 2018

(65) Prior Publication Data

US 2020/0133912 A1    Apr. 30, 2020

(51) Int. Cl.
| | |
|---|---|
| *G06F 15/177* | (2006.01) |
| *G06F 13/42* | (2006.01) |
| *G06F 1/20* | (2006.01) |
| *G06F 13/40* | (2006.01) |

(52) U.S. Cl.
CPC .......... *G06F 15/177* (2013.01); *G06F 1/20* (2013.01); *G06F 13/4063* (2013.01); *G06F 13/4282* (2013.01); *G06F 2213/0016* (2013.01)

(58) Field of Classification Search
CPC ...... G06F 15/177; G06F 1/20; G06F 13/4282; G06F 13/4063
See application file for complete search history.

(56) References Cited

U.S. PATENT DOCUMENTS

| | | | | |
|---|---|---|---|---|
| 8,635,416 | B1* | 1/2014 | de la Iglesia | G06F 3/061 |
| | | | | 711/154 |
| 10,506,013 | B1* | 12/2019 | Brown | H04L 65/608 |
| 2007/0130407 | A1* | 6/2007 | Olson | G06F 13/4282 |
| | | | | 710/305 |
| 2007/0234136 | A1* | 10/2007 | Leef | H04L 1/0061 |
| | | | | 714/704 |
| 2014/0281102 | A1* | 9/2014 | Feldman | G06F 13/4282 |
| | | | | 710/310 |
| 2016/0246754 | A1* | 8/2016 | Rao | G06F 13/4286 |
| 2016/0364347 | A1* | 12/2016 | Yeung | G06F 13/1673 |
| 2018/0150302 | A1* | 5/2018 | Chuang | G06F 21/575 |
| 2019/0235890 | A1* | 8/2019 | Schnoor | G06F 13/4282 |

* cited by examiner

*Primary Examiner* — Zahid Choudhury
(74) *Attorney, Agent, or Firm* — Fogarty LLP (57) ABSTRACT

Embodiments provide a proxy between device management messaging protocols that are used to manage devices that are I2C bus endpoints coupled to a remote access controller. A map is generated of the detected I2C bus endpoints. Mapped I2C bus endpoints that support PLDM (Platform Level Data Model) messaging are identified. Next, the mapped I2C bus endpoints that do not correspond to an identified PLDM endpoint are presumed to be IPMI (Intelligent Platform Management Interface) endpoints and are mapped accordingly. A virtual PLDM endpoint for each of the presumed IPMI I2C bus endpoints. A remote access controller is configured for use of PLDM messaging with the virtual PLDM endpoints such that these PLDM messages are translated by the proxy to equivalent IPMI commands and transmitted to the IPMI endpoints. The proxy similarly converts IPMI messages from the IPMI endpoints to equivalent PLDM messages and provided to the remote access controller via the virtual PLDM endpoint.

20 Claims, 3 Drawing Sheets

DEVICE MANAGEMENT MESSAGING PROTOCOL PROXY

FIELD

The present disclosure generally relates to Information Handling Systems (IHSs), and, more particularly, to bus communications between components of IHSs.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

In various embodiments, method is provided for managing a plurality of devices of an IHS (Information Handling System), wherein each managed device is an I2C bus endpoint. The method includes: generating a map of the detected I2C bus endpoints, wherein each endpoint corresponds to a managed device of the plurality of managed devices; identifying a first set of mapped I2C bus endpoints that support PLDM (Platform Level Data Model) messaging; determining a second set of mapped I2C bus endpoints that do not correspond to an identified I2C bus endpoint that supports PLDM messaging, wherein the second set of mapped endpoints utilize IPMI (Intelligent Platform Management Interface) messaging; configuring a virtual PLDM endpoint for each of the second set of mapped I2C bus endpoints corresponding to IPMI endpoints; and presenting the virtual PLDM endpoints corresponding to the IPMI endpoints for management by a remote access controller as PLDM devices.

In various additional embodiments, the method also includes: receiving a PLDM message from the remote access controller, the message for a first virtual PLDM endpoint; translating the PLDM message to an IPMI message; and transmitting the IPMI message to a first IPMI endpoint corresponding to the virtual PLDM endpoint. In various additional embodiments, the method also includes: receiving an IPMI message from the first IPMI endpoint; translating the IPMI message to a PLDM message; and transmitting the PLDM message to the remote access controller, where the PLDM message is transmitted as originating from the virtual PLDM endpoint. In various additional method embodiments, the IPMI endpoint is managed as the virtual PLDM endpoint by the remote access controller. In various additional method embodiments, the virtual PLDM endpoint is managed by a management utility of the remote access controller, wherein the management utility is used to manage PLDM endpoints and virtual PLDM endpoints. In various additional method embodiments, the PLDM message comprises a firmware update and wherein the firmware update is translated to a plurality of IPMI packets transmitted to the first IPMI endpoint. In various additional method embodiments, the service processor does not operate the I2C bus to communicate with the IPMI endpoints due to the IPMI endpoints being managed as virtual PLDM endpoints.

In various additional embodiments, an I2C controller is configured to support device management messaging for a plurality of managed devices of an IHS (Information Handling System), wherein each managed device is an I2C bus endpoint. The I2C controller includes: one or more processors; and a memory device coupled to the one or more processors, the memory device storing computer-readable instructions that, upon execution by the one or more processors, cause the I2C controller to: generate a map of the detected managed device I2C bus endpoints; identify a first set of mapped I2C bus endpoints that support PLDM (Platform Level Data Model) messaging; determine a second set of mapped I2C bus endpoints that do not correspond to an identified I2C bus endpoint that supports PLDM messaging, wherein the second set of mapped endpoints utilize IPMI (Intelligent Platform Management Interface) messaging; configure a virtual PLDM endpoint for each of the second set of mapped I2C bus endpoints corresponding to IPMI endpoints; and present the virtual PLDM endpoints corresponding to the IPMI endpoints for management by a remote access controller as PLDM devices.

In various additional I2C controller embodiments, the execution of the instructions further causes the I2C controller to: receive a PLDM message from the remote access controller, the message for a first virtual PLDM endpoint; translate the PLDM message to an IPMI message; and transmit the IPMI message to a first IPMI endpoint corresponding to the virtual PLDM endpoint. In various additional I2C controller embodiments, the execution of the instructions further causes the I2C controller to: receive an IPMI message from the first IPMI endpoint; translate the IPMI message to a PLDM message; and transmit the PLDM message, as originating from the virtual PLDM endpoint, to the remote access controller. In various additional I2C controller embodiments, the first IPMI endpoint is managed as the virtual PLDM endpoint by the remote access controller. In various additional I2C controller embodiments, the virtual PLDM endpoint is managed by a management utility of the remote access controller, wherein the management utility is used to manage PLDM endpoints and virtual PLDM endpoints. In various additional I2C controller embodiments, the I2C controller manages device management messaging on behalf of a service processor of the remote access controller. In various additional I2C controller embodiments, the service processor does not operate the I2C bus to communicate with the IPMI endpoints due to the IPMI endpoints being managed as virtual PLDM endpoints.

In various additional embodiments, a system for managing device management messaging includes: a remote access controller configured to manage a plurality of devices of an IHS (Information Handling System), wherein each managed device is an I2C bus endpoint; an I2C controller configured to: generate a map of the detected managed device I2C bus endpoints; identify a first set of mapped I2C bus endpoints that support PLDM (Platform Level Data Model) messaging; determine a second set of mapped I2C bus endpoints that do not correspond to an identified PLDM bus endpoints, wherein the second set of mapped endpoints utilize IPMI (Intelligent Platform Management Interface) messaging; configure a virtual PLDM endpoint for each of the second set of mapped I2C bus endpoints; and present the virtual PLDM endpoints corresponding to the IPMI endpoints for management by a remote access controller as PLDM devices.

In various additional system embodiments, the remote access controller is further configured to: receive a PLDM message from the remote access controller, the message for a first virtual PLDM endpoint; translate the PLDM message to an IPMI message; and transmit the IPMI message t to a first IPMI endpoint corresponding to the virtual PLDM endpoint. In various additional system embodiments, the I2C controller is further configured to: receive an IPMI message from the first IPMI endpoint; translate the IPMI message to a PLDM message; and transmit the PLDM message, as originating from the virtual PLDM endpoint, to the remote access controller. In various additional system embodiments, the first IPMI endpoint is managed as the virtual PLDM endpoint by the remote access controller. In various additional system embodiments, the virtual PLDM endpoint is managed by a management utility of the remote access controller, wherein the management utility is used to manage PLDM endpoints and virtual PLDM endpoints. In various additional system embodiments, the service processor does not operate the I2C bus to communicate with the IPMI endpoints due to the IPMI endpoints being managed as virtual PLDM endpoints.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Remote management of IHSs supports the centralized administration of virtualized systems that are configured from these remotely managed IHSs. Remote management of an IHS may be implemented using components such as the remote access controller described herein that monitors various aspects of the operation of the IHS. Such monitoring may be implemented using sideband bus communications between the remote access controller and internal managed devices of the IHS. Various bus messaging protocols may be utilized for communications between the remote access controller and the managed devices. IPMI (Intelligent Platform Management Interface) is a common interface for communicating with managed devices.

More recently, PLDM (Platform Level Data Model) has emerged as a more richly featured messaging protocol for communicating with managed devices. In many cases, PLDM messaging is implemented using MCTP (Management Component Transport Protocol) communications. Despite the adoption of PLDM messaging, IPMI managed devices remain in use and IPMI is expected to remain in use indefinitely. Both IPMI and PLDM device management messages may be transmitted via an I2C sideband management bus coupling a remote access controller and the managed devices.

Figure 1:
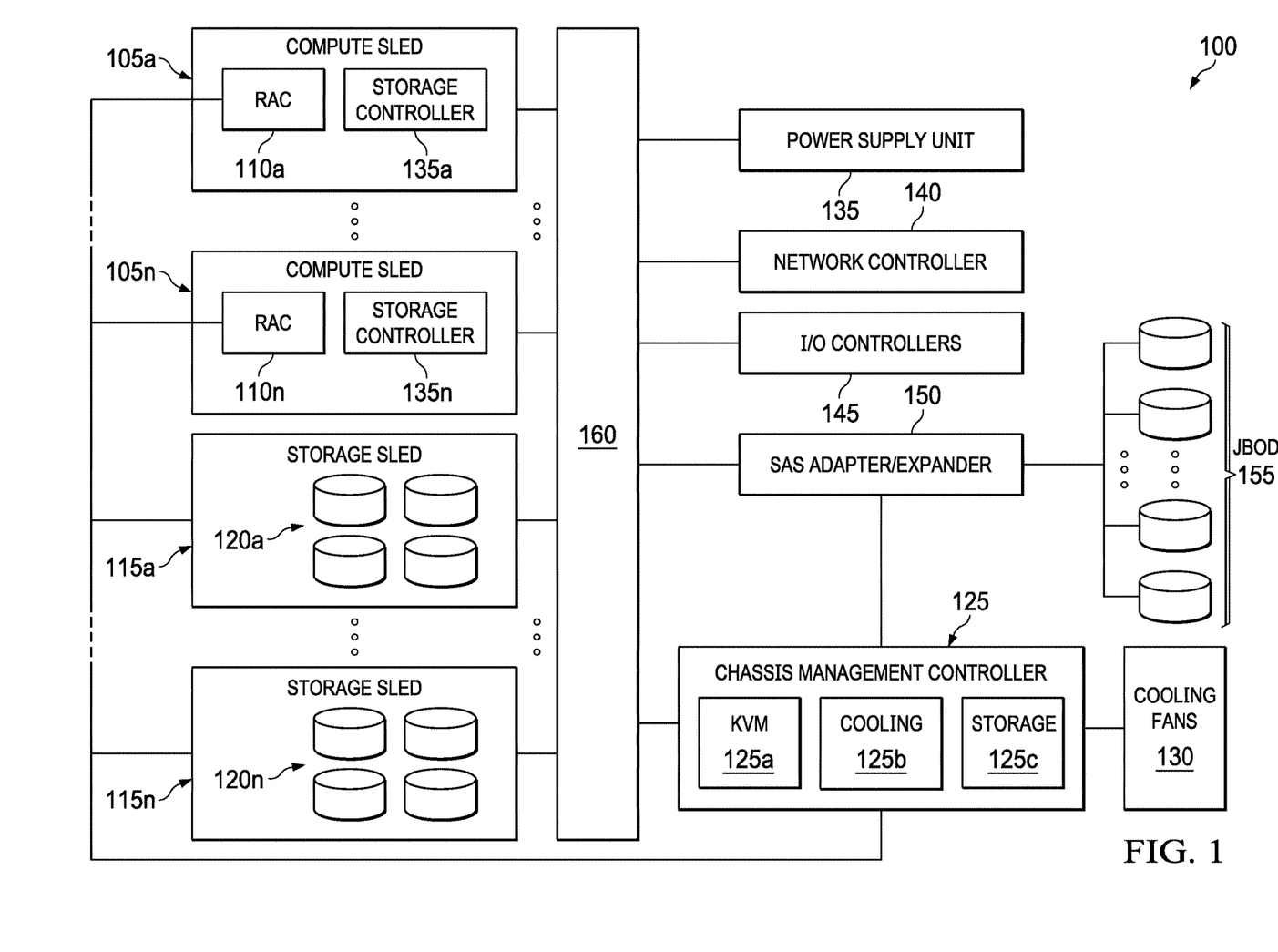
FIG. 1 is a diagram illustrating certain components of a chassis, according to some embodiments, for remote management of IHSs installed in the chassis.

FIG. 1 is a block diagram illustrating certain components of a chassis 100 comprising one or more compute sleds 105a-n and one or more storage sleds 115a-n that may be configured to implement the systems and methods described herein. Chassis 100 may include one or more bays that each receive an individual sled (that may be additionally or alternatively referred to as a tray, blade, and/or node), such as compute sleds 105a-n and storage sleds 115a-n. Chassis 100 may support a variety of different numbers (e.g., 4, 8, 16, 32), sizes (e.g., single-width, double-width) and physical configurations of bays. Other embodiments may include additional types of sleds that provide various types of storage and/or processing capabilities. Other types of sleds may provide power management and networking functions. Sleds may be individually installed and removed from the chassis 100, thus allowing the computing and storage capabilities of a chassis to be reconfigured by swapping the sleds with different types of sleds, in many cases without affecting the operations of the other sleds installed in the chassis 100.

Multiple chassis 100 may be housed within a rack. Data centers may utilize large numbers of racks, with various different types of chassis installed in the various configurations of racks. The modular architecture provided by the sleds, chassis and rack allow for certain resources, such as cooling, power and network bandwidth, to be shared by the compute sleds 105a-n and the storage sleds 115a-n, thus providing efficiency improvements and supporting greater computational loads.

Chassis 100 may be installed within a rack structure that provides all or part of the cooling utilized by chassis 100. For airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air from within the sleds 105a-n, 115a-n installed within the chassis. A rack and a chassis 100 installed within the rack may utilize various configurations and combinations of cooling fans to cool the sleds 105a-n, 115a-n and other components housed within chassis 100.

The sleds 105a-n, 115a-n may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160. In various embodiments, backplane 160 may include various additional components, such as cables, wires, midplanes, backplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140 and power supply unit 135.

Figure 2:
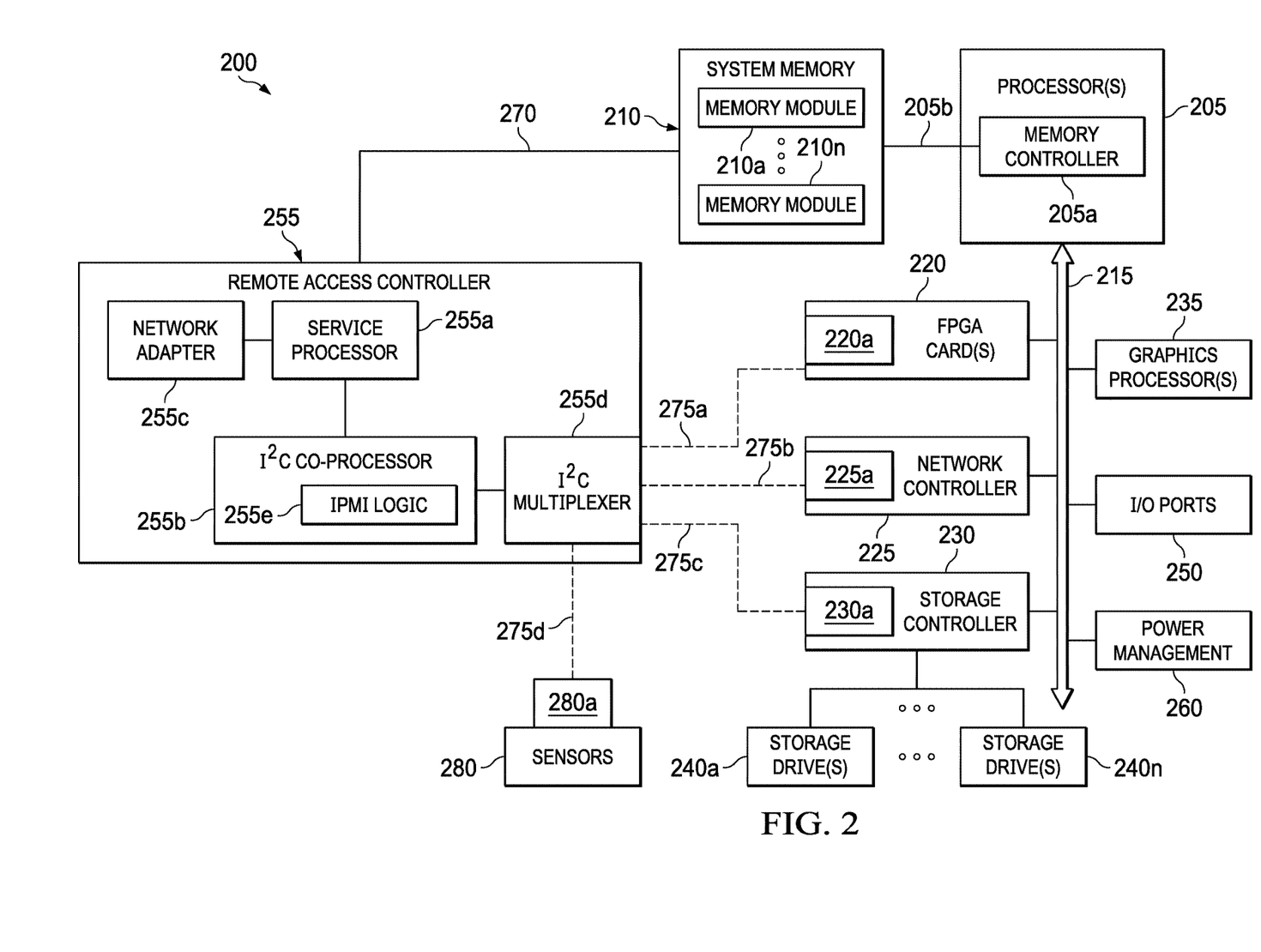
FIG. 2 is a diagram illustrating certain components of an IHS configured as a component of chassis, according to some embodiments, to implement a proxy between device management messaging protocols used to manage components of the IHS.

In certain embodiments, a compute sled 105a-n may be an IHS such as described with regard to IHS 200 of FIG. 2. A compute sled 105a-n may provide computational processing resources that may be used to support a variety of e-commerce, multimedia, business and scientific computing applications, such as services provided via a cloud implementation. Compute sleds 105a-n are typically configured with hardware and software that provide leading-edge computational capabilities. Accordingly, services provided using such computing capabilities are typically provided as high-availability systems that operate with minimum downtime. As described in additional detail with regard to FIG. 2, compute sleds 105a-n may be configured for general-purpose computing or may be optimized for specific computing tasks.

As illustrated, each compute sled 105a-n includes a remote access controller (RAC) 110a-n. As described in additional detail with regard to FIG. 2, remote access controller 110a-n provides capabilities for remote monitoring and management of compute sled 105a-n. In support of these monitoring and management functions, remote access controllers 110a-n may utilize both in-band and sideband (i.e., out-of-band) communications with various components of a compute sled 105a-n and chassis 100. Remote access controller 110a-n may collect sensor data, such as temperature sensor readings, from components of the chassis 100 in support of airflow cooling of the chassis 100 and the sleds 105a-n, 115a-n. In addition, each remote access controller 110a-n may implement various monitoring and administrative functions related to compute sleds 105a-n that require sideband bus connections with various internal components of the respective compute sleds 105a-n.

Figure 3:
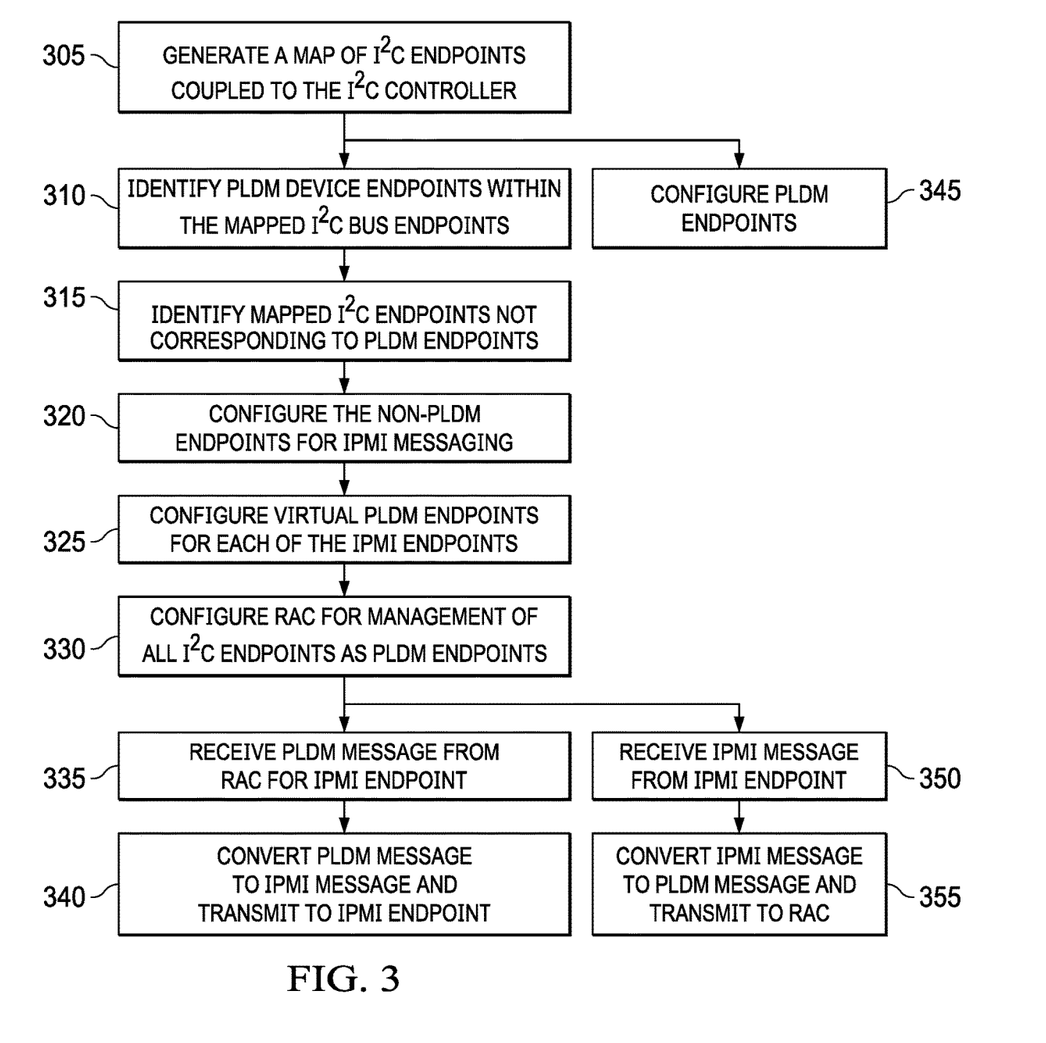
FIG. 3 is a flowchart describing certain steps of a method, according to some embodiments, for implementing a proxy between device management messaging protocols used to manage components of the IHS.

As described in additional detail with regard to FIGS. 2 and 3, a remote access controller 110a-n may provide capabilities support remote monitoring and managing of IHSs, such as compute sleds 105a-n. In certain embodiments, certain capabilities of the remote access controllers 110a-n may be based on sideband monitoring and managing of various internal components of IHSs, such as the sideband management of storage controllers 135a-n by the respective remote access controllers 110a-n. In certain embodiments, the remote access controllers 110a-n may be configured to support managed devices that utilize different device management messaging protocols, such as IPMI and PLDM.

As illustrated, chassis 100 also includes one or more storage sleds 115a-n that are coupled to the backplane 160 and installed within one or more bays of chassis 200 in a similar manner to compute sleds 105a-n. Each of the individual storage sleds 115a-n may include various different numbers and types of storage devices. For instance, storage sleds 115a-n may include SAS (Serial Attached SCSI) magnetic disk drives, SATA (Serial Advanced Technology Attachment) magnetic disk drives, solid-state drives (SSDs) and other types of storage drives in various combinations. The storage sleds 115a-n may be utilized in various storage configurations by the compute sleds 105a-n that are coupled to chassis 100.

Each of the compute sleds 105a-n includes a storage controller 135a-n that may be utilized to access storage drives that are accessible via chassis 100. Some of the individual storage controllers 135a-n may provide support for RAID (Redundant Array of Independent Disks) configurations of logical and physical storage drives, such as storage drives provided by storage sleds 115a-n. In some embodiments, some or all of the individual storage controllers 135a-n may be HBAs (Host Bus Adapters) that provide more limited capabilities in accessing physical storage drives provided via storage sleds 115a-n and/or via SAS expander 150.

In addition to the data storage capabilities provided by storage sleds 115a-n, chassis 100 may provide access to other storage resources that may be installed components of chassis 100 and/or may be installed elsewhere within a rack housing the chassis 100, such as within a storage blade. In certain scenarios, such storage resources 155 may be accessed via a SAS expander 150 that is coupled to the backplane 160 of the chassis 100. The SAS expander 150 may support connections to a number of JBOD (Just a Bunch Of Disks) storage drives 155 that may be configured and managed individually and without implementing data redundancy across the various drives 155. The additional storage resources 155 may also be at various other locations within a datacenter in which chassis 100 is installed. Such additional storage resources 155 may also may be remotely located.

As illustrated, the chassis 100 of FIG. 1 includes a network controller 140 that provides network access to the sleds 105a-n, 115a-n installed within the chassis. Network controller 140 may include various switches, adapters, controllers and couplings used to connect chassis 100 to a network, either directly or via additional networking components and connections provided via a rack in which chassis 100 is installed. Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units.

Chassis 100 may also include various I/O controllers 140 that may support various I/O ports, such as USB ports that may be used to support keyboard and mouse inputs and/or video display capabilities. Such I/O controllers 145 may be utilized by the chassis management controller 125 to support various KVM (Keyboard, Video and Mouse) 125a capabilities that provide administrators with the ability to interface with the chassis 100. The chassis management controller 125 may also include a storage module 125c that provides capabilities for managing and configuring certain aspects of the storage devices of chassis 100, such as the storage devices provided within storage sleds 115a-n and within the JBOD 155.

In addition to providing support for KVM 125a capabilities for administering chassis 100, chassis management controller 125 may support various additional functions for sharing the infrastructure resources of chassis 100. In some scenarios, chassis management controller 125 may implement tools for managing the power 135, network bandwidth 140 and airflow cooling 130 that are available via the chassis 100. As described, the airflow cooling 130 utilized by chassis 100 may include an airflow cooling system that is provided by a rack in which the chassis 100 may be installed and managed by a cooling module 125b of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 shows an example of an IHS 200 configured to implement systems and methods described herein. It should be appreciated that although the embodiments described herein may describe an IHS that is a compute sled or similar computing component that may be deployed within the bays of a chassis, other embodiments may be utilized with other types of IHSs. In the illustrative embodiment of FIG. 2, IHS 200 may be a computing component, such as compute sled 105a-n, that is configured to share infrastructure resources provided by a chassis 100.

The IHS 200 of FIG. 2 may be a compute sled, such as compute sleds 105a-n of FIG. 1, that may be installed within a chassis, that may in turn be installed within a rack. Installed in this manner, IHS 200 may utilized shared power, network and cooling resources provided by the chassis and/or rack. IHS 200 may utilize one or more processors 205. In some embodiments, processors 205 may include a main processor and a co-processor, each of which may include a plurality of processing cores that, in certain scenarios, may each be used to run an instance of a server process. In certain embodiments, one or all of processor(s) 205 may be graphics processing units (GPUs) in scenarios where IHS 200 has been configured to support functions such as multimedia services and graphics applications.

As illustrated, processor(s) 205 includes an integrated memory controller 205a that may be implemented directly within the circuitry of the processor 205, or the memory controller 205a may be a separate integrated circuit that is located on the same die as the processor 205. The memory controller 205a may be configured to manage the transfer of data to and from the system memory 210 of the IHS 205 via a high-speed memory interface 205b.

The system memory 210 is coupled to processor(s) 205 via a memory bus 205b that provides the processor(s) 205 with high-speed memory used in the execution of computer program instructions by the processor(s) 205. Accordingly, system memory 210 may include memory components, such as such as static RAM (SRAM), dynamic RAM (DRAM), NAND Flash memory, suitable for supporting high-speed memory operations by the processor(s) 205. In certain embodiments, system memory 210 may combine both persistent, non-volatile memory and volatile memory.

In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty components. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each processor 205. All or portions of the chipset may be implemented directly within the integrated circuitry of an individual processor 205. The chipset may provide the processor(s) 205 with access to a variety of resources accessible via one or more buses 215. Various embodiments may utilize any number of buses to provide the illustrated pathways served by bus 215. In certain embodiments, bus 215 may include a PCIe (PCI Express) switch fabric that is accessed via a PCIe root complex. IHS 200 may also include one or more I/O ports 250, such as PCIe ports, that may be used to couple the IHS 200 directly to other IHSs, storage resources or other peripheral components.

As illustrated, a variety of resources may be coupled to the processor(s) 205 of the IHS 200 via bus 215. For instance, processor(s) 205 may be coupled to a network controller 225, such as provided by a Network Interface Controller (NIC) that is coupled to the IHS 200 and allows the IHS 200 to communicate via an external network, such as the Internet or a LAN. Processor(s) 205 may also be coupled to a power management unit 260 that may interface with the power system unit 135 of the chassis 100 in which an IHS, such as a compute sled, may be installed. In certain embodiments, a graphics processor 235 may be comprised within one or more video or graphics cards, or an embedded controller, installed as components of the IHS 200. In certain embodiments, graphics processor 235 may be an integrated of the remote access controller 255 and may be utilized to support the display of diagnostic and administrative interfaces related to IHS 200 via display devices that are coupled, either directly or remotely, to remote access controller 255.

As illustrated, IHS 200 may include one or more FPGA (Field-Programmable Gate Array) card(s) 220. Each of the FPGA card 220 supported by IHS 200 may include various processing and memory resources, in addition to an FPGA integrated circuit that may be reconfigured after deployment of IHS 200 through programming functions supported by the FPGA card 220. Each individual FGPA card 220 may be optimized to perform specific processing tasks, such as specific signal processing, security, data mining, and artificial intelligence functions, and/or to support specific hardware coupled to IHS 200.

In certain embodiments, IHS 200 may operate using a BIOS (Basic Input/Output System) that may be stored in a non-volatile memory accessible by the processor(s) 205. The BIOS may provide an abstraction layer by which the operating system of the IHS 200 interfaces with the hardware components of the IHS. Upon powering or restarting IHS 200, processor(s) 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for use by the IHS 200. In certain embodiments, IHS 200 may utilize Unified Extensible Firmware Interface (UEFI) in addition to or instead of a BIOS.

In certain embodiments, the functions provided by a BIOS may be implemented, in full or in part, by the remote access controller 255.

In certain embodiments, remote access controller 255 may operate from a different power plane from the processors 205 and other components of IHS 200, thus allowing the remote access controller 255 to operate, and management tasks to proceed, while the processing cores of IHS 200 are powered off. As described, various functions provided by the BIOS, including launching the operating system of the IHS 200, may be implemented by the remote access controller 255. In some embodiments, the remote access controller 255 may perform various functions to verify the integrity of the IHS 200 and its hardware components prior to initialization of the IHS 200 (i.e., in a bare-metal state).

Remote access controller 255 may include a service processor 255a, or specialized microcontroller, that operates management software that supports remote monitoring and administration of IHS 200. Remote access controller 255 may be installed on the motherboard of IHS 200 or may be coupled to IHS 200 via an expansion slot provided by the motherboard. In support of remote monitoring functions, network adapter 225c may support connections with remote access controller 255 using wired and/or wireless network connections via a variety of network technologies. As a non-limiting example of a remote access controller, the integrated Dell Remote Access Controller (iDRAC) from Dell® is embedded within Dell PowerEdge™ servers and provides functionality that helps information technology (IT) administrators deploy, update, monitor, and maintain servers remotely.

In some embodiments, remote access controller 255 may support monitoring and administration of various managed devices 220, 225, 230, 280 of an IHS via a sideband bus interface. For instance, messages utilized in device management may be transmitted using I2C sideband bus connections 275a-d that may be individually established with each of the respective managed devices 220, 225, 230, 280 through the operation of an I2C multiplexer 255d of the remote access controller. As illustrated, certain of the managed devices of IHS 200, such as FPGA cards 220, network controller 225 and storage controller 230, are coupled to the IHS processor(s) 205 via an in-line bus 215, such as a PCIe root complex, that is separate from the I2C sideband bus connections 275a-d used for device management. The management functions of the remote access controller 255 may utilize information collected by various managed sensors 280 located within the IHS. For instance, temperature data collected by sensors 280 may be utilized by the remote access controller 255 in support of closed-loop airflow cooling of the IHS 200.

In certain embodiments, the service processor 255a of remote access controller 255 may rely on an I2C co-processor 255b to implement sideband I2C communications between the remote access controller 255 and managed components 220, 225, 230, 280 of the IHS. The I2C co-processor 255b may be a specialized co-processor or microcontroller that is configured to interface via a sideband I2C bus interface with the managed hardware components 220, 225, 230, 280 of IHS. In some embodiments, the I2C co-processor 255b may be an integrated component of the service processor 255a, such as a peripheral system-on-chip feature that may be provided by the service processor 255a. Each I2C bus 275a-d is illustrated as single line in FIG. 2. However, each I2C bus 275a-d may be comprised of a clock line and data line that couple the remote access controller 255 to I2C endpoints 220a, 225a, 230a, 280a which may be identified as modular field replaceable units (FRUs).

In various scenarios, a portion of the managed devices 220, 225, 230, 280 may support I2C bus 275a-d communications that utilize IPMI (Management Component Transport Protocol) messaging. For instance, certain types of legacy and less-sophisticated managed devices, such as temperature sensors 280, may utilize IPMI messaging and may thus be identified on the I2C bus 275d as an IPMI endpoints by the I2C coprocessor 255b. An IHS 200 may include a variety of IPMI sensors 280 that collect various types of readings, such as temperature, intrusion detection and power consumption.

Another portion of the managed devices 220, 225, 230, 280 may support I2C bus 275a-d communications that utilize PLDM (Platform Level Data Model) messaging. For instance, managed devices that support complex management functions by the remote access controller 255, such as management functions for configuring operations of a storage controller 230, may utilize PLDM messaging. Such PLDM endpoints may utilize features of MCTP in order to discover compliant endpoints coupled to the device management bus. As described in additional detail with regard to FIG. 3, in certain embodiments, the I2C co-processor 255b may be configured to support proxy PLDM endpoints that correspond to IPMI managed devices. In particular, I2C coprocessor 255b may include an IPMI logic 255e sub-component that allows IPMI endpoint devices, such as sensors 280, to be managed by the service processor 255a as PLDM endpoints.

As illustrated, the I2C co-processor 255b may interface with the individual managed devices 220, 225, 230, 280 via individual sideband I2C buses 275a-d selected through the operation of an I2C multiplexer 255d. Via switching operations by the I2C multiplexer 255d, a sideband bus connection 275a-d may be established by a direct coupling between the I2C co-processor 255b and an individual managed device 220, 225, 230, 280.

In conventional configurations, a service processor may interface with the I2C multiplexer directly in processing IPMI messages with IPMI-compliant managed devices. In such scenarios, service processor may process IPMI messages directly rather than offload them to the I2C coprocessor, since there may be little benefit in offloading relatively straightforward IPMI messages. Additionally, the management functions supported by a conventional I2C coprocessor for PLDM endpoints are not applicable to IPMI endpoints such that there is little benefit to the service processor in offloading IPMI messaging to the I2C coprocessor. In addition, in such conventional scenarios, contention for the I2C multiplexer may arise when the I2C multiplexer is being accessed concurrently by both the I2C coprocessor for PLDM transmissions and by the service processor for IPMI messages. In such scenarios, the I2C sideband management bus may be inadvertently disabled due to deadlock conditions created by the I2C coprocessor and the service processor attempting to manipulate the I2C multiplexer concurrently.

In providing sideband management capabilities, the I2C co-processor 255b may each interoperate with corresponding endpoint I2C controllers 220a, 225a, 230a, 280a that implement the I2C communications of the respective managed devices 220, 225, 230. The endpoint I2C controllers 220a, 225a, 230a, 280a may be implemented as a dedicated microcontroller for communicating sideband I2C messages with the remote access controller 255, or endpoint I2C controllers 220a, 225a, 230a, 280a may be integrated SoC functions of a processor of the respective managed device endpoints 220, 225, 230, 280. In various embodiments, certain of the endpoint I2C controllers 220a, 225a, 230a, 280a may be IPMI endpoints identified by an IPMI endpoint address while other endpoint I2C controllers 220a, 225a, 230a, 280a may be identified using PLDM endpoint discovery.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

FIG. 3 is a flowchart describing certain steps of a method, according to some embodiments, for implementing a proxy between device management messaging protocols used to manage components of the IHS. The method of FIG. 3 provides a technique for identifying and configuring IPMI devices for management by the remote access controller as if the IPMI devices were PLDM devices. The remote access controller allows IPMI devices to be managed as PLDM devices and thus supports the concurrent management of IPMI device and PLDM devices using PLDM management tools and.

The illustrated embodiment begins at block 305 with a scanning procedure that generates a map of the I2C endpoints coupled to the remote access controller via I2C buses, such as the I2C buses 275a-d by which managed device endpoints 220, 225, 230, 280 are coupled to the I2C coprocessor 255b of remote access controller 255. The generated map of I2C endpoints identifies slave addresses for each of the managed device endpoints 220, 225, 230, and 280 that are coupled to the I2C bus. In certain embodiments, the mapping of I2C endpoints is performed by the I2C coprocessor that implements certain I2C device management communications on behalf of a remote access controller.

Using the slave addresses generated in the mapping of I2C endpoints, at block 310, the I2C coprocessor identifies which of the mapped I2C endpoints correspond to PLDM compatible devices. In certain embodiments, the I2C endpoints interrogates each of the slave address endpoints identified on the device management bus in order to elicit responses from those endpoints that support PLDM messaging. At 315, the mapped I2C endpoints are identified that do not respond to the PLDM interrogation and thus are not PLDM endpoints. These I2C endpoints are presumed to utilize IPMI messaging and, at 320, are assigned addresses and configured as IPMI endpoints on the device management bus.

At block 345, the remote access controller may configure the PLDM endpoints based on the responses received in response to interrogation of the slave address endpoints. As PLDM devices, these managed devices may be configured and managed using richly featured tools that are designed to leverage the capabilities of PLDM. In conventional scenarios, IPMI managed devices may still be monitored and managed by the remote access controller, but through different tools than used for PLDM device management. This results in an inefficiency for administrators and also precludes cohesive management of the IPMI and PLDM devices. For instance, in scenarios where an IHS includes both IPMI sensors and PLDM sensors, the otherwise compatible sensor data from the two types of sensors may not be managed using the same management tools.

Embodiments provide support for both PLDM and IPMI managed device endpoints, while providing the remote access controller with a PLDM interface for all of the endpoints on the device management bus. At block 325 of the process, the I2C coprocessor configures a virtual PLDM endpoint for each of the IPMI endpoints. The virtual PLDM endpoint may be configured to mirroring the IPMI characteristics of the device and the remote access controller may be notified of the virtual PLDM endpoint configuration. In this manner, the PLDM discovery features utilized by the remote access controller may be seamlessly used by the remote access controller to be notified of the IPMI managed devices in the form of the virtual PLDM endpoint managed by the I2C controller. At 330, the remote access controller is configured for management of the IPMI managed device endpoints via the virtual PLDM endpoint supported by the I2C coprocessor.

Once configured in this manner, at 335, the I2C coprocessor may receive PLDM messages from the remote access controller that are directed at a virtual PLDM endpoint. At 340, the I2C logic of the I2C coprocessor is used to translate the PLDM message to an equivalent IPMI message. The equivalent IPMI message is then transmitted to the IPMI managed device endpoint via the device management bus. In certain embodiments, the I2C logic may be identify PLDM messages directed to a virtual PLDM endpoint where the PLDM messages are too large to be converted to a single IPMI message. In such scenarios, the I2C logic may translate the PLDM message into an equivalent IPMI message and divide the message into multiple IPMI packets that may be transmitted to the managed IPMI device where the IPMI message may be reconstructed and processed.

In certain embodiments, this capability of the I2C logic may be utilized to support delivery of firmware updates to IPMI devices supported as virtual PLDM endpoints. In conventional scenarios, IPMI messaging does not support delivery of firmware updates to managed devices. PLDM messaging, however, does support delivery of firmware updates to managed devices. The I2C logic according to embodiments may support the delivery of firmware updates to IPMI devices. When a PLDM message that includes a firmware update payload is received by the I2C logic and the message is directed to a virtual PLDM endpoint, the I2C logic may divide the firmware payload into multiple IPMI packets. The multiple IPMI packets are received by the IPMI device and reconstructed to form the firmware update. The IPMI device may be configured to detect the delivery of a firmware update in this manner and to respond by initiating firmware update procedures.

At block 350, the I2C coprocessor receives an IPMI message from an IPMI device that is managed as a virtual PLDM endpoint. At block 355, the IPMI logic of the I2C coprocessor is used to translate the IPMI message to an equivalent PLDM message, which is then related to the remote access controller as a message from the virtual PLDM endpoint corresponding to the IPMI device. The remote management controller proceeds to manage the virtual PLDM endpoint without awareness of the IPMI device that is actually managed.

By relying on the I2C coprocessor for managing communications with both PLDM and IPMI managed devices, the service processor no longer manages IPMI messaging. Even if the computational savings to the service processor are modest, as described, by eliminating (or just reducing) instances in which the service processor accesses the I2C device management bus, such as via operation of the I2C multiplexer of FIG. 2, the occurrences of bus contention with the I2C coprocessor are reduced, resulting in fewer inoperable bus states being triggered and thus resulting in an increase in reliability in the device management bus.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for managing a plurality of devices of an IHS (Information Handling System), wherein each managed device is an I2C bus endpoint, the method comprising:
    generating a map of the detected I2C bus endpoints, wherein each endpoint corresponds to a managed device of the plurality of managed devices;
    identifying a first set of mapped I2C bus endpoints that support PLDM (Platform Level Data Model) messaging;
    determining a second set of mapped I2C bus endpoints that do not correspond to an identified I2C bus endpoint that supports PLDM messaging, wherein the second set of mapped endpoints utilize IPMI (Intelligent Platform Management Interface) messaging;
    configuring a virtual PLDM endpoint for each of the second set of mapped I2C bus endpoints corresponding to IPMI endpoints; and
    presenting the virtual PLDM endpoints corresponding to the IPMI endpoints for management by a remote access controller as PLDM devices.

2. The method of claim 1, further comprising:
    receiving a PLDM message from the remote access controller, the message for a first virtual PLDM endpoint;
    translating the PLDM message to an IPMI message; and
    transmitting the IPMI message to a first IPMI endpoint corresponding to the virtual PLDM endpoint.

3. The method of claim 2, further comprising:
    receiving an IPMI message from the first IPMI endpoint;
    translating the IPMI message to a PLDM message; and
    transmitting the PLDM message to the remote access controller, where the PLDM message is transmitted as originating from the virtual PLDM endpoint.

4. The method of claim 3, wherein the IPMI endpoint is managed as the virtual PLDM endpoint by the remote access controller.

5. The method of claim 4, wherein the virtual PLDM endpoint is managed by a management utility of the remote access controller, wherein the management utility is used to manage PLDM endpoints and virtual PLDM endpoints.

6. The method of claim 2, wherein the PLDM message comprises a firmware update and wherein the firmware update is translated to a plurality of IPMI packets transmitted to the first IPMI endpoint.

7. The method of claim 6, wherein the service processor does not operate the I2C bus to communicate with the IPMI endpoints due to the IPMI endpoints being managed as virtual PLDM endpoints.

8. An I2C controller configured to support device management messaging for a plurality of managed devices of an IHS (Information Handling System), wherein each managed device is an I2C bus endpoint, the I2C controller comprising:
    one or more processors; and
    a memory device coupled to the one or more processors, the memory device storing computer-readable instructions that, upon execution by the one or more processors, cause the I2C controller to:
        generate a map of the detected managed device I2C bus endpoints;
        identify a first set of mapped I2C bus endpoints that support PLDM (Platform Level Data Model) messaging;
        determine a second set of mapped I2C bus endpoints that do not correspond to an identified I2C bus endpoint that supports PLDM messaging, wherein the second set of mapped endpoints utilize IPMI (Intelligent Platform Management Interface) messaging;
        configure a virtual PLDM endpoint for each of the second set of mapped I2C bus endpoints corresponding to IPMI endpoints; and
        present the virtual PLDM endpoints corresponding to the IPMI endpoints for management by a remote access controller as PLDM devices.

9. The I2C controller of claim 8, wherein the execution of the instructions further causes the I2C controller to:
    receive a PLDM message from the remote access controller, the message for a first virtual PLDM endpoint;
    translate the PLDM message to an IPMI message; and
    transmit the IPMI message to a first IPMI endpoint corresponding to the virtual PLDM endpoint.

10. The I2C controller of claim 9, wherein the execution of the instructions further causes the I2C controller to:

receive an IPMI message from the first IPMI endpoint;
translate the IPMI message to a PLDM message; and
transmit the PLDM message, as originating from the virtual PLDM endpoint, to the remote access controller.

11. The I2C controller of claim 10, wherein the first IPMI endpoint is managed as the virtual PLDM endpoint by the remote access controller.

12. The I2C controller of claim 11, wherein the virtual PLDM endpoint is managed by a management utility of the remote access controller, wherein the management utility is used to manage PLDM endpoints and virtual PLDM endpoints.

13. The I2C controller of claim 8, wherein the I2C controller manages device management messaging on behalf of a service processor of the remote access controller.

14. The I2C controller of claim 13, wherein the service processor does not operate the I2C bus to communicate with the IPMI endpoints due to the IPMI endpoints being managed as virtual PLDM endpoints.

15. A system for managing device management messaging, the system comprising:
   a remote access controller configured to manage a plurality of devices of an IHS (Information Handling System), wherein each managed device is an I2C bus endpoint;
   an I2C controller configured to:
      generate a map of the detected managed device I2C bus endpoints;
      identify a first set of mapped I2C bus endpoints that support PLDM (Platform Level Data Model) messaging;
      determine a second set of mapped I2C bus endpoints that do not correspond to an identified PLDM bus endpoints, wherein the second set of mapped endpoints utilize IPMI (Intelligent Platform Management Interface) messaging;
      configure a virtual PLDM endpoint for each of the second set of mapped I2C bus endpoints; and
      present the virtual PLDM endpoints corresponding to the IPMI endpoints for management by a remote access controller as PLDM devices.

16. The system of claim 15, wherein the remote access controller is further configured to:
   receive a PLDM message from the remote access controller, the message for a first virtual PLDM endpoint;
   translate the PLDM message to an IPMI message; and
   transmit the IPMI message t to a first IPMI endpoint corresponding to the virtual PLDM endpoint.

17. The system of claim 16, wherein the I2C controller is further configured to:
   receive an IPMI message from the first IPMI endpoint;
   translate the IPMI message to a PLDM message; and
   transmit the PLDM message, as originating from the virtual PLDM endpoint, to the remote access controller.

18. The system of claim 17, wherein the first IPMI endpoint is managed as the virtual PLDM endpoint by the remote access controller.

19. The system of claim 18, wherein the virtual PLDM endpoint is managed by a management utility of the remote access controller, wherein the management utility is used to manage PLDM endpoints and virtual PLDM endpoints.

20. The system of claim 14, wherein the service processor does not operate the I2C bus to communicate with the IPMI endpoints due to the IPMI endpoints being managed as virtual PLDM endpoints.

* * * * *

UNITED STATES PATENT AND TRADEMARK OFFICE
CERTIFICATE OF CORRECTION

PATENT NO. : 10,783,109 B2
APPLICATION NO. : 16/169727
DATED : September 22, 2020
INVENTOR(S) : Gupta et al.

Page 1 of 1

It is certified that error appears in the above-identified patent and that said Letters Patent is hereby corrected as shown below:

In the Claims

In Column 16, Line 14, Claim 16, delete "t to" and insert -- to -- therefor.

Signed and Sealed this
Twenty-seventh Day of October, 2020

Andrei Iancu
*Director of the United States Patent and Trademark Office*